United States Patent
Schanin

(10) Patent No.: US 6,581,396 B2
(45) Date of Patent: *Jun. 24, 2003

(54) REFRIGERATED VENDING MACHINE EXPLOITING EXPANDED TEMPERATURE VARIANCE DURING POWER-CONSERVATION MODE

(75) Inventor: David J. Schanin, San Carlos, CA (US)

(73) Assignee: Bayview Technology Group, LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/151,513

(22) Filed: May 20, 2002

(65) Prior Publication Data

US 2002/0139134 A1 Oct. 3, 2002

Related U.S. Application Data

(63) Continuation of application No. 09/579,411, filed on May 25, 2000, now Pat. No. 6,389,822, which is a continuation-in-part of application No. 09/182,586, filed on Oct. 28, 1998, now Pat. No. 6,243,626.

(51) Int. Cl.[7] ............................. F25B 1/00; G05D 23/00
(52) U.S. Cl. ....................... 62/180; 236/47; 221/150 R
(58) Field of Search ............................ 62/89, 231, 180, 62/378; 221/150 R; 236/47; 700/240, 242

(56) References Cited

U.S. PATENT DOCUMENTS

| | | | |
|---|---|---|---|
| 4,417,450 A | * 11/1983 | Morgan, Jr. et al. | |
| 4,448,346 A | * 5/1984 | Kuwaki et al. | ........... 236/46 R |
| 4,752,853 A | 6/1988 | Matsko et al. | ................. 36/94 |
| 5,249,706 A | * 10/1993 | Szabo | ................. 222/146.6 X |
| 5,475,609 A | 12/1995 | Apothaker | .................. 700/292 |
| 5,574,653 A | 11/1996 | Coomer et al. | ............. 700/286 |
| 5,625,236 A | 4/1997 | Lefebvre et al. | .............. 307/41 |
| 5,675,503 A | 10/1997 | Moe et al. | .................. 700/296 |
| 5,696,695 A | 12/1997 | Ehlers et al. | ............... 700/286 |
| 5,739,596 A | 4/1998 | Takizawa et al. | ............. 307/66 |
| 5,761,083 A | 6/1998 | Brown, Jr. et al. | ......... 700/296 |
| 5,943,246 A | 8/1999 | Porter | ........................ 307/43 |
| 5,962,989 A | 10/1999 | Baker | ........................ 315/294 |
| 6,104,968 A | 8/2000 | Ananth | ....................... 700/297 |
| 6,112,135 A | 8/2000 | Peterson et al. | ............ 700/293 |
| 6,243,626 B1 | 6/2001 | Schanin | ..................... 700/286 |
| 6,389,822 B1 | * 5/2002 | Schanin | |

* cited by examiner

*Primary Examiner*—William Wayner
(74) *Attorney, Agent, or Firm*—Gordon & Jacobson, P.C.

(57) ABSTRACT

A refrigerated soda vending machine includes sensors for monitoring various parameters such as temperature within its refrigerated chamber and for monitoring occupancy in the chamber vicinity. Sensor data is used to determine when to switch between normal and power-conservation modes of operation. In either mode, a cooling system is regulated so that a compressor goes on when an upper internal temperature threshold is reached and off when a lower internal temperature threshold is reached. In normal mode, fans circulate air to maintain a relatively uniform temperature throughout the chamber. During power-conservation mode, the fans are mostly off when the compressor is off. In the absence of circulation, the temperature within the refrigerated chamber stratifies so that a lower cool zone and an upper warm zone can be differentiated. Soda cans are held in vertical stacks so that the lowest cans are located in the cool zone.

19 Claims, 2 Drawing Sheets

REFRIGERATED VENDING MACHINE EXPLOITING EXPANDED TEMPERATURE VARIANCE DURING POWER-CONSERVATION MODE

This application is a continuation of U.S. Ser. No. 09/579,411 filed on May 25, 2000, to be issued as U.S. Pat. No. 6,389,822, which is a continuation-in-part of U.S. Ser. No. 09/182,586 filed on Oct. 28, 1998, now issued as U.S. Pat. No. 6,243,626.

BACKGROUND OF THE INVENTION

1. Field of the Invention

The present invention relates to refrigerated vending machines and, more particularly, to power-conserving refrigerated vending machines. A major objective of the present invention is to provide continuous availability of cold product with temporarily reduced power consumption.

2. State of the Art

Vending machines provide for cost-effective delivery of consumer items. In principle, they provide full-time product availability with minimal intervention by a human operator. However, full-time operation can result in wasted energy consumption as the machine may be on for long intervals of inactivity. The concern for energy consumption is especially acute in the case of refrigerated vending machines.

Refrigerated vending machines maintain their contents below ambient temperatures. There can be various reasons for keeping the dispensable items cold. Cold generally helps preserve perishable food items. In some cases, for example, with soda and other beverages, the items may taste better chilled. In other cases, the refrigerated vending machine can be used in conjunction with a heating device, such as a microwave oven, to allow chilled food, e.g., such as sandwiches, to be heated to a desirable temperature before consumption.

Typically, the dispensable items are maintained within a chamber that is thermally insulated from the exterior of the vending machine. A cooling system withdraws heat from the chamber. The cooling system can include an evaporator, a compressor, a condenser, and a metering (flow constricting) device.

When the cooling system is on, coolant liquid, e.g., Freon, enters the evaporator. The evaporator is thermally coupled to the refrigerated chamber. The coolant liquid is generally colder than the chamber so that the coolant removes heat from the chamber. The liquid evaporates as it absorbs the heat.

The evaporated coolant is pumped out of the evaporator through a suction line by a compressor. The compressor increases the pressure of the coolant, raising its temperature in the process. The pressurized coolant is then directed to a condenser via a discharge line.

The condenser couples the coolant to a chilled environment. This causes the coolant to give up heat and condense into a liquid. The liquid flows through a liquid line, including the flow meter (which is basically a flow restriction) back to the evaporator to begin another cooling cycle.

The evaporator removes heat from the nearby chamber air. To ensure that the cool air reaches the dispensable items and to ensure a uniform temperature within the chamber, the chamber air is circulated. Generally, one or more fans are operated within the chamber interior to effect this circulation.

One or more thermo-sensors monitor the temperature inside the chamber. Typically, there is a desired temperature range for the vended items, for example, 0°–2° C. (~32°–36° F.) for sodas. When the chamber temperature reaches the higher threshold, the compressor is activated and the cooling process begins. When the chamber temperature falls to the lower threshold, the compressor is turned off, and cooling effectively halts. Another cooling cycle can begin when the temperature reaches the upper threshold due to inevitable heat transfer through the chamber wall.

Refrigerated vending machines consume considerable electric power. Typically, most of the power consumed by a refrigerated vending machine is consumed by the cooling system, and especially by the compressor, even though it is not operated continuously. However, the fans, the dispensing mechanism, the money handling mechanisms, panel lights, sensors, and control electronics all consume power. For reasons of energy conservation and cost, it is desirable to be able to reduce the energy consumed by a refrigerated vending machine without adversely affecting its service (to patrons) and its economic (to the vending machine owner) aspects.

The most straightforward approach to saving energy is to disconnect AC power. For example, a vending machine could be turned off during non-business hours, e.g., from 10 pm to 6 am. To avoid the inconvenience of manual activation and inactivation, an external timer can be used to control AC power to the vending machine. However, whether power to the vending machine is switched by a human operator or a timer, potential patrons are denied dispensable items during off hours.

Parent patent application Ser. No. 09/182,586 discloses an external power control system for a vending machine that includes an occupancy sensor. This can be used to ensure a vending machine is on whenever people are in its vicinity. An ambient thermo-sensor can also be included to determine a reactivation time to prevent the dispensable items from become unacceptably warm.

Using even an effective external device is not ideal. From a manufacturing viewpoint, there is duplication of components. For example, the external power controller must have its own housing, its own power supply, and own control electronics. Also, the vending machine operator must manage two devices instead of one. From a power-conservation standpoint, power is less likely to be saved if it requires a separate device to be purchased, installed, and set up. Accordingly, refrigerated vending machines with built-in power-conservation features are desired.

On approach allows a vending machine to be programmed to allow different target cooling set points at different times. in this case, for example, a vending machine can be programmed to have a higher set point during periods of expected inactivity (e.g., non-business hours). Raising the set point can have a significant impact on power consumption since power is consumed roughly in proportion to the differential between the ambient temperature and the desired chamber temperature. When the set point is higher, the compressor duty cycle is reduced, thus reducing overall power consumption.

This varying set-point approach is attractive in that the vending machine is always on and ready to do business. The dispensable items are warmer than ideal, but only by an amount determined by variations in the set point. However, there is generally not much latitude for raising set points.

The set points used in normal operation are typically chosen carefully to achieve optimal cooling of dispensable items without wasting power. Power savings beyond those achieved during normal operation typically exact a penalty, e.g., possibly compromising the freshness or taste of the dispensable items. What is needed is a system that provides for power conservation without adverse affects on the dispensable items.

SUMMARY OF THE INVENTION

The present invention provides for normal and power-conservation modes of operation. During normal operation, the average chamber temperature is maintained within an optimal range, and the spatial variance of the temperature is kept relatively small. During power-conservation mode, the average chamber temperature is allowed to rise above the optimal range, and the temperature variance is allowed to increase. Due to the increase in temperature variance, the minimum temperature rises, if at all, more slowly than the average temperature. A patron's expectation for a chilled item can be met by dispensing items stored in a relatively cool zone of the chamber even when the average chamber temperature is above the optimal range.

In effect, power is conserved by reducing the volume of the chamber maintained at the desired temperature. This allows at least some dispensable items to remain within a desired temperature range even while the average temperature in the enclosing chamber exceeds the desired temperature. In general, temperature variance can be increased simply by turning off forced circulation, e.g., turning off fans. The items that most require maintenance of the desired temperature, either to preserve freshness or for optimal taste, are preferably located in a "cool zone" instead of a "warm zone".

In normal-operation mode, forced circulation of air or other heat transfer medium promotes a relatively uniform (low-variance) temperature distribution throughout the refrigerated chamber. Of course, it is not necessary that circulation be forced all the time during normal operation, but it should be forced most of the time during normal operation even when the cooling system is off (i.e., the cooling system is not expending energy to remove heat from the chamber). In power-conservation mode, forced-air circulation is avoided most of, if not all, the time the cooling system is off. However, forced-air circulation can be used while the cooling system is on to transfer heat from the chamber interior to the cooling system for removal from the chamber. While forced-air circulation is off, the chamber air stratifies to define the warm and the cool zones.

In one realization of the invention, items are arranged so that cooler items will be dispensed before warmer items. For example, a soda vending machine can arrange soda cans in stacks, and dispense from the bottom of the stacks. In this case, the stack bottoms can be in the cool zone, while the stack tops can be in the warm zone. Thus, a patron requesting a soda after an extended period of power-conservation mode operation receives a soda that is cooler than the average soda at the time of the request.

The invention provides for combining this preferential cooling approach with activity detection. Activity can be detected when money is inserted into the vending machine or, more predictively, using an occupancy sensor. In either case, the detected activity can trigger a transition from power-conservation mode to normal mode. A complementary lack of activity determination can reinstate the power-conservation mode. The algorithm for switching modes can also include absolute-time, e.g., time-of-year, determinations.

In the soda example, the cans to be dispensed next are kept the coolest. There are alternative criteria for determining which items to keep coolest. For example, items most requiring cold to maintain freshness, e.g., tuna sandwiches, can be stored at the bottom of the refrigerated chamber. Items that can remain fresh and tasty at higher temperatures, e.g., potato chips, are stored in a higher region of the chamber. In this case, the vending machine can employ horizontal rather than vertical dispensing.

A test relating to the invention yielded the surprising result that, after a two-hour interval in power-savings mode, soda cans at the bottom of respective stacks were colder than they were at the beginning of the interval. This test demonstrates the viability of the inventive approach in practice.

As long as normal mode is resumed with the advent of activity, considerable power can be saved without any penalty in practice. Serendipitously, the invention provides for further savings: since circulation fans are off in power conservation mode, they do not consume power, so overall power consumption is reduced. Moreover, since the fans are off, they do not dissipate heat into the refrigerated chamber; thus they do not aggravate the average temperature rise during power conservation mode. These and other features and advantages of the invention are apparent from the description below with reference to the following drawings.

DESCRIPTION OF THE PREFERRED EMBODIMENTS

Figure 1:
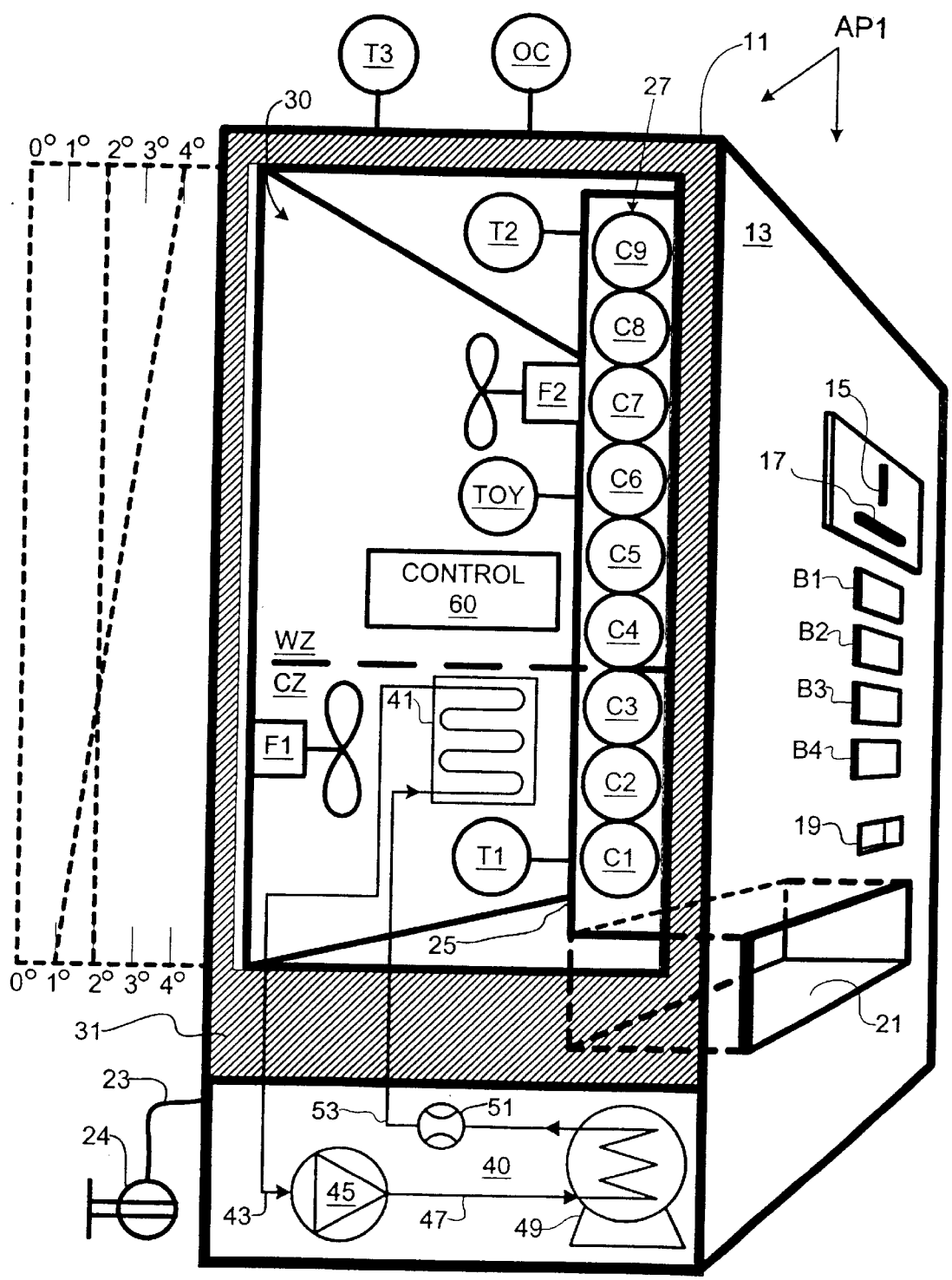
FIG. 1 is a schematic view of a soda vending machine in accordance with the present invention. A graph on the left side of the figure shows the temperature distribution at two different times during an extended period in power-conservation mode.

A soda vending machine AP1 in accordance with the present invention includes a housing 11 with a front panel 13, as shown in FIG. 1. The front panel includes a coin slot 15 and a bill slot 17, soda selection buttons B1, B2, B3, and B4, a coin return slot 19, and a dispensed soda slot 21, as shown in FIG. 1. Typically, a patron inserts a suitable amount of money in coin slot 15 and/or bill slot 17, depresses a selection button B1–B4, and receives a can of the selected soda from dispensed soda slot 21. If the patron inserts more than the required amount for purchase, vending machine AP1 provides change at coin return slot 21. Power for vending machine AP1 is through a power cord 23 plugged into a 120-volt electric outlet 24.

A soda-can dispensing mechanism 25 holds soda cans in four vertical stacks (one stack 27 shown). Each stack is intended to hold the type of sodas indicated by a respective one of soda selection buttons B1–B4; for example, depressing button B1 serves as a request for an item from stack 27. In stack 27, nine cans C1–C9 are stacked. When a patron depresses button B1, dispensing mechanism 25 dispenses soda can C1. The remaining cans C2–C8 then move down, assisted by gravity, one soda-can position each. Dispensing mechanism 25 and the cans it holds are located within a chamber 30 that is thermally insulated from its exterior by insulation 32.

A cooling system 40 is used to keep chamber 30 and its contents near freezing so that the soda is optimally chilled. Cooling system 40 includes an evaporator 41, a suction line 43, a compressor 45, a discharge line 47, a condenser 49, and a flow meter 51 located along liquid line 53. Evaporator 41 is located within chamber 30 and withdraws heat therefrom. The remaining components of cooling system 40 serve to recycle the coolant so that it can remove heat continuously from chamber 30.

Cooling system 40 primarily cools the air near evaporator 41. Fans F1 and F2 circulate air within chamber 30 so that the cool air chills the cans and their contents. In addition, the circulation ensures a relatively uniform temperature distribution, i.e., a relatively low temperature variance, within chamber 30.

Coolant system 40 is controlled by controller 60 of vending machine AP1. Controller 60 monitors an input from thermo-sensor T1 to determine the vending machine temperature. Controller 60 is preprogrammed with a lower threshold temperature and an upper threshold temperature. The vending machine operator can reset these thresholds as appropriate. In the present case, the lower threshold is 0° C. and the upper threshold is 2° C.

During normal operation, when the temperature exceeds the upper threshold, controller 60 turns coolant system 40 on. Specifically, this involves activating compressor 45. This circulates the Freon refrigerant, and cools the chamber. The cooling process continues until the lower threshold is reached. At that point, controller 60 turns cooling system 40 off. During normal operations, fans F1 and F2 remain on even when cooling system 40 is off to minimize temperature variance within chamber 30.

In accordance with the present invention, vending machine AP1 provides for a power-conservation mode. While the algorithm used for entering and exiting power-conservation mode is programmable, the default program determines the mode based on occupancy and chamber temperature. Occupancy indications are provided to controller 60 by an external occupancy sensor OC, and chamber temperatures are indicated by a thermo-sensor T1.

Figure 2:
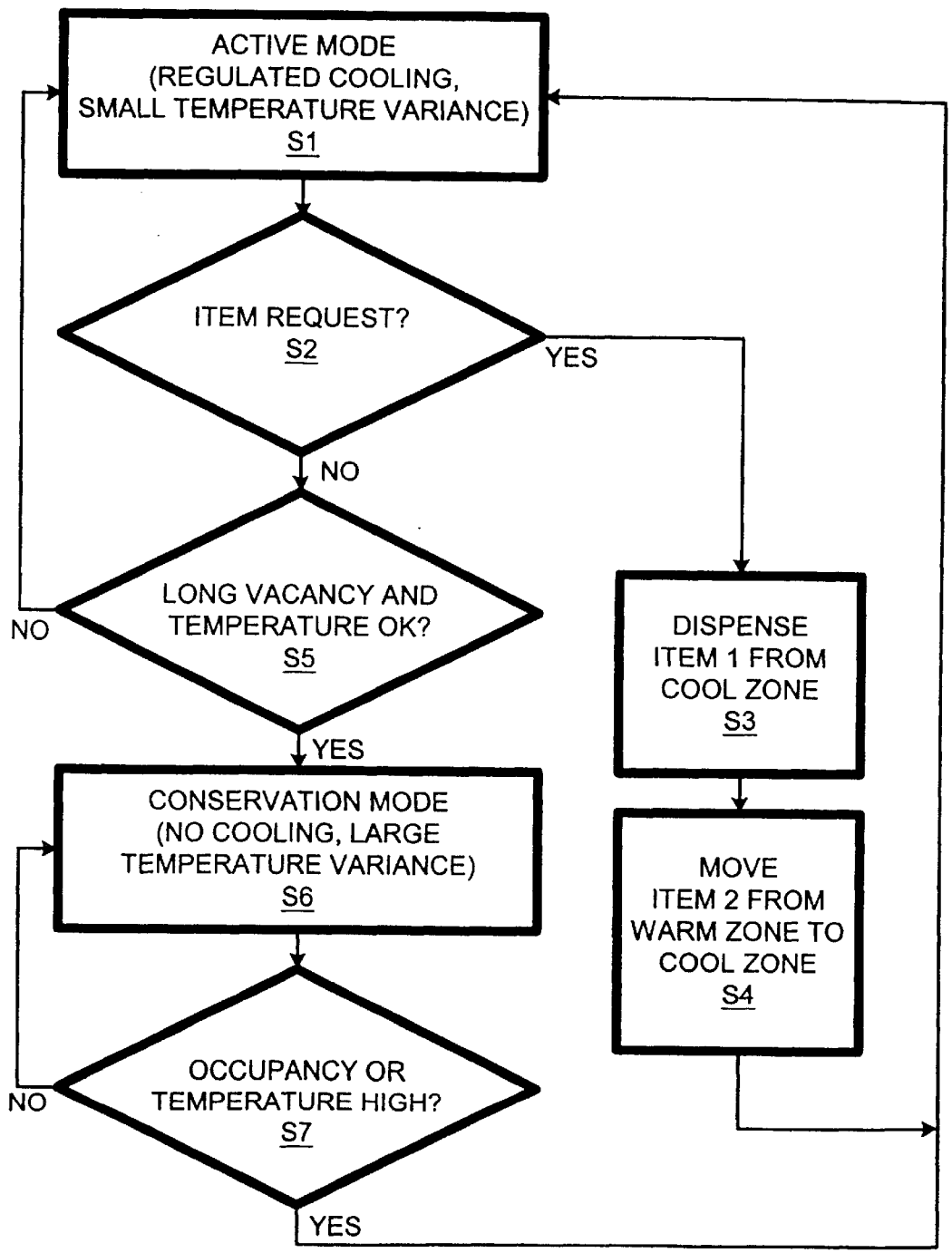
FIG. 2 is a flow chart of a method of the invention practiced in the context of the vending machine of FIG. 1.

A method M1 of the invention that encompasses this default and other programs of operation is flow charted in FIG. 2. Initially, it can be presumed that vending machine AP1 is in normal mode at step S1. Step S2 involves checking whether or not a request for a soda has been made. Such a request normally takes the form of depressing a button B1–B4 after an appropriate sum of money has been inserted into slots 15 and 17. The invention provides for embodiments in which a request is made while a vending machine is in power-conservation mode. However, vending machine AP1 enters normal mode when a potential patron is detected by occupancy sensor OC, and in any event by the time money is inserted, so dispensing does not normally occur while vending machine AP1 is in power-conservation mode.

If there is a pending request, a first item of the requested type is dispensed from the stack bottom at step S3. This dispensing leaves a vacancy in the respective stack. Accordingly, the remaining cans in the stack move down, under the force of gravity, to fill the vacancy at step S4. Method M1 returns from step S4 to normal mode operation. This return to normal mode is desirable to replace the cold that was removed with the dispensed item. In addition, the request for a soda is a predictor of possible additional requests.

If there is no pending request at step S2, a determination is made at step S5 whether the following subconditions are met: 1) the surrounds have been vacant for a 15-minute duration, and 2) the temperature indicated by thermo-sensor T1 is below the upper threshold. Unless both subconditions are met, method M1 continues in normal mode as indicated by the return arrow to step S1.

If, at step S5, it is determined that the area monitored by the occupancy sensor OC is vacant for a 15-minute duration and the temperature indicated by thermo-sensor T1 is below the upper threshold, power-conservation mode is entered at step S6. In power-conservation mode, coolant system 40 and fans F1 and F2 are shut down. Controller 60 and sensors T1 and OC remain active.

While vending machine AP1 is in power-conservation mode, sensors T1 and OC are still monitored at step S7. If the area remains vacant and the temperature indicated by thermo-sensor T1 remains below the upper threshold, power-conservation mode continues, as indicated by the return arrow to step S6. If the temperature indicated by thermo-sensor T1 goes above the upper threshold or if occupancy is detected by sensor OC, then normal operation is resumed, as indicated by the return arrow from step S7 to step S1.

During power-conservation mode, the average temperature within the interior of chamber 40 goes up, but the temperature near the bottom lags. Depending on how full vending machine AP1 is when power conservation mode begins, the temperature indicated by thermo-sensor T1 might go up slowly, stay the same, or even go down. This last case is indicated by the graph on the left side of FIG. 1. The straight line at 2° C. can be the temperature profile of chamber 40 at the end of a period of normal mode operation and at the beginning of the following power-conservation mode period. The curve that slants from 1° C. at the base of chamber 40 to 4° C. at the top of chamber 40 indicates a temperature profile two hours later. Note that bottom can C1 gets colder during power-conservation mode.

By way of explanation, it is suggested that the cold stored in chamber 40, and particularly in the can contents, stratifies in the absence of the circulation due to fans F1 and F2. In that case, heat rises and the colder temperatures accumulate at the base of chamber 40.

This creates a cool zone CZ near the bottom of chamber 40 and a warm zone WZ near the top of chamber 40. The position of can C1 is within cool zone CZ and the position of can C9 is within warm zone WZ. The dividing line between these zones can be arbitrarily assigned to a position between the levels of cans C3 and C4.

During a two-hour power-conservation period with no cooling, upper cans C4–C9 become warmer than optimal. Can C3 remains optimally cool, and cans C2 and C1 are below the upper threshold. As power-conservation mode continues, the average temperature within chamber 40 continues to rise and can C3 may warm above the upper threshold. However, can C1 remains below the upper threshold for considerably longer.

Unless power-conservation mode is interrupted, the temperature sensed by thermo-sensor T1 will detect that the upper threshold is reached. This triggers cooling system 40 and fans F1 and F2. This causes the average chamber temperature to drop and the chamber temperature distribution to become uniform. Once the lower temperature threshold is reached, cooling system 40 and fans F1 and F2 turn off. In this case, the average temperature starts to rise, and the cool and the warm zones differentiate again.

Even after an extended period of power-conservation mode, a patron can request a soda and receive one properly chilled. Specifically, can C1 in cool zone CZ is dispensed (step S3 in method M1) in response to a request corresponding to the soda flavor associated with can C1. As can C1 vacates its position within chamber 40, the remaining cans C2–C9 drop down one can position each. One can, in this case can C4, drops from warm zone WZ to cool zone CZ.

In view of the detected activity, either as a function of occupancy or of money-insertion, normal mode is entered prior to the dispensing of can C1. Fans F1 and F2 turn on, reducing the temperature variance within chamber 30. This causes the temperature sensed by thermo-sensor T1 to rise rapidly. The resulting temperature indication to controller 60 causes it to trigger cooling system 40 so that the average chamber temperature drops.

Power-conservation mode saves energy in several ways. If the power-conservation interval is sufficiently short, e.g., two hours, no cooling is performed during it. If cooling cycles are required during power-conservation mode, these are less frequent than during normal mode (because power-conservation mode allows the average temperature to rise further between cooling cycles). This reduces the number of times the compressor has to start up-thus saving energy involved in starting up the cooling system. In addition, there is less heat transfer from the chamber exterior while the average chamber temperature is elevated during power-conservation mode. Finally, energy is saved while the fans are off as less energy is used and less heat is dissipated into the refrigerated chamber.

The operation of vending machine AP1 is programmable. The lower and higher temperature thresholds can be adjusted. Also, the vacancy time before power-conservation mode is entered can be adjusted. In addition, an occupancy interval can be set so that a single occupancy detection does not cause power-conservation mode to be exited. (Thus, a check by a night watchman need not set off extended compressor activity.)

In addition to occupancy sensor OC and thermo-sensor T1, vending machine includes other sensors that can be used in controlling the mode of operation. An absolute-time sensor, such as time-of-year sensor TOY, can be used to affect vending machine behavior at certain times of the day, on certain days of the week, and certain holidays. For vending system AP1, time-of-year sensor TOY can be used to preclude power-conservation mode during business hours, or to require power-conservation mode during a maintenance shift.

Vending machine AP1 includes a second internal thermo-sensor T2, located in the upper half of chamber 30. Thermo-sensor T2 can be used to trigger normal mode when the temperature above the center of chamber 30 gets too high, even though the bottom temperature is below its upper threshold. This can accommodate a temperature for chilled juices that is required to maintain freshness. In addition, it can address steep temperature gradients when vending machine AP1 is below capacity.

In addition to the two internal thermo-sensors, vending machine AP1 includes an optional external thermo-sensor T3. The external temperature affects the rate at which the chamber temperature rises while the cooling system is off. It also affects the rate at which the cooling system can cool the chamber. Accordingly, controller 60 can be programmed to exit power-conservation mode sufficiently before some predicted active time (like the start of a business day) so that all the full contents of vending machine AP1 are adequately chilled.

Similarly, external thermo-sensor T3 can be used to delay power conservation mode if doing so can prevent an intermediate normal cycle due solely to excessive internal temperature. For example, it might be preferable to enter power-conservation mode at 11 pm instead of 9 pm if doing so avoids exiting power-conservation mode at 4 am rather than a more useful 6 am. Clearly, there are many other possible programming modes for vending machine AP1. For reasons of economy and simplicity, one or both of thermo-sensors T2 and T3 can be omitted, as can occupancy sensor OC.

While in the preferred embodiment, thermo-sensor T1 is monitored during power-conservation mode, this is not a strict necessity. Power-conservation mode can be simply timed. Also, the interval used for power-conservation mode can be set as a function of exterior temperature as measured by exterior thermo-sensor T3.

System AP1 provides for additional modes of operation. For example, there can be more than one power-conservation mode: a deeper power-conservation mode can be used in off-hours than during business hours. For example, during off-hours, only one-fourth of the cans need to be kept optimally cool, while during inactive business hours, half of the cans might be kept cool.

Furthermore, the modes of operation can have submodes. For example, there can be one power-conservation submode in which panel lights are off and another in which panel lights are on. An occupancy detection can be used to trigger a switch from panel-lights-off submode to panel-lights-on submode, while a lapse of time without an occupancy detection can trigger a switch in the reverse direction. Normal mode is resumed upon money insertion. The idea is to maximize power conservation when no one is present to purchase soda. When anyone is present, the panel lights are illuminated to indicate the machine is working and to invite a purchase. However, if the occupancy detection is due to a brief visit, e.g., by maintenance workers or a night watchman, a relatively expensive switch to normal mode can be avoided. The panel lights-off submode can be considered the default. Also, during nonbusiness hours, occupancy detections can be used to turn on vending machine lights to let prospective patrons know the machine is working. Normal mode would only be activated if money were inserted into a slot. Obviously, many other power-conservation programs can be selected based on particular circumstances.

The invention applies to soda vending machines that differ in various ways form system AP1. Different capacities, dispensing means, circulation systems, cooling systems, etc., are provided for. In addition, the present invention provides for other chilled beverages such as juices and other non-carbonated beverages. More generally, the present invention provides for vending any products that require chilling for taste or freshness or other reason.

The present invention provides for stratifying products according to the extent and/or importance of chilling. More perishable foods can be located toward the bottom of the vending machine. Products with a lower desired temperature can be located toward the bottom. In this context, horizontal dispensing mechanisms can be utilized. These and other variations upon and modifications to the present invention are provided for by the present invention, the scope of which is defined by the following claims.

What is claimed is:

1. A refrigerated vending system for vending items, said system comprising:
    a chamber for storing said items, said chamber defining a chamber interior and a chamber exterior, said chamber interior including said items and a heat-transfer medium;
    a cooling system which removes heat from said chamber, said cooling system having cooling and non-cooling conditions, said cooling system consuming more power and removing more heat in said cooling condition and consuming less power and removing less heat in said non-cooling condition;

a fan which circulates said heat-transfer medium thereby affecting the temperature variance within said chamber interior, said fan having circulating and non-circulating conditions;

a first thermo-sensor which provides temperature indications of temperature within said chamber interior; and a controller which controls said cooling system and said fan, said controller selecting between a normal mode of operation for said vending system and a power-conservation mode of operation for said vending system, said controller during said normal mode, selecting between said cooling and said non-cooling conditions of said cooling system as a function of said temperature indications provided by at least said first thermo-sensor, and maintaining said fan in said circulating condition most of the time when said cooling system is in said non-cooling condition, and said controller during said power-conservation mode, selecting between said cooling and said non-cooling conditions, and maintaining said fan in said non-circulating condition most of the time when said cooling system is in said non-cooling condition.

2. A refrigerated vending system according to claim 1, further comprising:

a dispenser adapted to dispense said items from said chamber interior to said chamber exterior, wherein said controller further controls said dispenser.

3. A refrigerated vending system according to claim 2, wherein:

said chamber interior includes a cool zone and a warm zone, said cool zone having a lower space-and-time-averaged temperature than does said warm zone, said dispenser further adapted to store said items in said cool zone and said warm zone and to dispense items only from said cool zone.

4. A refrigerated vending system according to claim 3, wherein:

said cool zone is below said warm zone.

5. A refrigerated vending system according to claim 1, further comprising:

a second thermo-sensor which provides indications of temperature in an upper portion of said chamber, said first thermo-sensor providing temperature indications of temperature in a lower portion of said chamber, wherein said controller selecting between said normal mode and said power-conservation mode at least in part as a function of said indications of temperature provided by said second thermo-sensor.

6. A refrigerated vending system according to claim 1, further comprising:

an activity sensor which provides activity indications to said controller, said controller selecting between said normal mode and said power-conservation mode at least in part as a function of said activity indications.

7. A refrigerated vending system according to claim 6, further comprising:

an absolute-time indicator for providing absolute time indications, said controller selecting between said normal mode and said power-conservation mode in part as a function of said absolute-time indications.

8. A refrigerated vending system according to claim 7, further comprising:

an external thermo-sensor which provides indications of temperatures exterior to said chamber, said controller selecting between said normal mode and said power-conservation mode in part as a function of said external temperature indications.

9. A refrigerated vending system according to claim 1, wherein:

said activity sensor includes an occupancy sensor.

10. A refrigerated vending system for vending items, said system comprising:

a chamber for storing said items, said chamber defining a chamber interior and a chamber exterior, said chamber interior including said items and a heat-transfer medium;

cooling means for removing heat from said chamber, said cooling means having cooling and non-cooling conditions, said cooling means consuming more power and removing more heat in said cooling condition, said cooling means consuming less power and removing less heat in said non-cooling condition;

circulation means for controlling the temperature variance within said chamber interior by circulating said heat-transfer medium, said circulation means having circulating and non-circulating conditions;

thermo-sensor means including at least one thermo-sensor for providing temperature indications of temperature within said chamber interior; and controller means for controlling said cooling means and said circulation means, said controlling means selecting between a normal mode of operation for said vending system and a power-conservation mode of operation for said vending system, said controller means during said normal mode, selecting between said cooling and said non-cooling conditions of said cooling means as a function of said temperature indications provided by said thermo-sensor means, and maintaining said circulation means in said circulating condition most of the time when said cooling means is in said non-cooling condition; and during said power-conservation mode, selecting between said cooling and said non-cooling conditions, and maintaining said circulation means in said non-circulating condition most of the time when said cooling means is in said non-cooling condition.

11. A refrigerated vending system according to claim 10, further comprising:

dispensing means for dispensing said items from said chamber interior to said chamber exterior, wherein said controller means controls said dispensing means.

12. A refrigerated vending system according to claim 11, wherein said chamber interior includes a cool zone and a warm zone, said cool zone having a lower space-and-time-averaged temperature than does said warm zone, said dispensing means storing said items in said cool zone and said warm zone, said dispensing means dispensing items only from said cool zone.

13. A refrigerated vending system according to claim 12, wherein:

said cool zone is below said warm zone.

14. A refrigerated vending system according to claim 10, wherein:

said circulation means includes a fan that is on during said circulating condition and off during said non-circulating condition.

15. A refrigerated vending system according to claim 10, further comprising:

activity sensing means to provide activity indications, said controller means selecting between said normal mode and said power-conservation mode at least in part as a function of said activity indications.

16. A refrigerated vending system according to claim 15, wherein:

said activity sensing means includes an occupancy sensor.

17. A refrigerated vending system according to claim 10, further comprising:

an absolute-time indicator for providing absolute time indications, said controller means selecting between said normal mode and said power-conservation mode in part as a function of said absolute-time indications.

18. A refrigerated vending system according to claim 10, further comprising:

an external thermo-sensor means for providing indications of temperatures exterior to said chamber, said controller means selecting between said normal mode and said power-conservation mode in part as a function of said external temperature indications.

19. A refrigerated vending system according to claim 10, wherein:

said thermo-sensor means includes a second thermo-sensor which provides indications of temperature in an upper portion of said chamber, said first thermo-sensor providing temperature indications of temperature in a lower portion of said chamber, and said controller means selects between said normal mode and said power-conservation mode at least in part as a function of said indications of temperature provided by said second thermo-sensor.

* * * * *